United States Patent
Yang

(10) Patent No.: US 10,614,551 B2
(45) Date of Patent: Apr. 7, 2020

(54) IMAGE INTERPOLATION METHODS AND RELATED IMAGE INTERPOLATION DEVICES THEREOF

(71) Applicant: Shanghai Zhaoxin Semiconductor Co., Ltd., Shanghai (CN)

(72) Inventor: Feifei Yang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 46 days.

(21) Appl. No.: 15/812,135

(22) Filed: Nov. 14, 2017

(65) Prior Publication Data

US 2019/0096031 A1 Mar. 28, 2019

(30) Foreign Application Priority Data

Sep. 25, 2017 (CN) .......................... 2017 1 0872597

(51) Int. Cl.
*G06T 3/40* (2006.01)
*G06T 7/13* (2017.01)
*G06T 7/269* (2017.01)

(52) U.S. Cl.
CPC ............ *G06T 3/403* (2013.01); *G06T 3/4007* (2013.01); *G06T 7/13* (2017.01); *G06T 7/269* (2017.01); *G06T 2207/20012* (2013.01); *G06T 2207/20021* (2013.01)

(58) Field of Classification Search
CPC ......... G06T 3/403; G06T 7/13; G06T 3/4007; G06T 5/20; G06T 7/269; G06T 3/40; H04N 9/646
See application file for complete search history.

(56) References Cited

U.S. PATENT DOCUMENTS

| 6,281,875 | B1 * | 8/2001 | Zhao ..................... G06T 3/4007 345/589 |
| 6,408,109 | B1 * | 6/2002 | Silver ...................... G06T 7/12 382/190 |
| 6,556,720 | B1 * | 4/2003 | Avinash ........... G01R 33/56563 382/128 |
| 6,674,903 | B1 * | 1/2004 | Cliquet .................... G06T 5/20 382/199 |
| 6,832,009 | B1 * | 12/2004 | Shezaf .................... G06T 3/403 382/300 |

(Continued)

FOREIGN PATENT DOCUMENTS

CN 103500435 A1 * 1/2014

*Primary Examiner* — Jingge Wu
(74) *Attorney, Agent, or Firm* — McClure, Qualey & Rodack, LLP

(57) ABSTRACT

Image interpolation methods for interpolating a destination pixel of a destination image by using a plurality of source pixels of a source image are provided. The method includes the steps of: selecting the plurality of source pixels from the source image corresponding to the destination pixel; obtaining a gradient direction and a gradient magnitude according to the plurality o source pixels; determining a weight corresponding to each of the plurality of source pixels according to the gradient direction and the gradient magnitude; and performing an interpolation operation according to pixel values of the plurality of source pixels and the weight corresponding to each of the plurality of source pixels to obtain a pixel value of the destination pixel.

20 Claims, 10 Drawing Sheets

(56) References Cited

U.S. PATENT DOCUMENTS

| | | | |
|---|---|---|---|
| 8,320,670 B1* | 11/2012 | Li | G06K 9/4633 382/168 |
| 2004/0008901 A1* | 1/2004 | Avinash | G06T 3/4007 382/260 |
| 2005/0094899 A1* | 5/2005 | Kim | G06T 3/4007 382/300 |
| 2008/0111916 A1* | 5/2008 | Wang | H04N 7/012 348/448 |
| 2009/0022402 A1* | 1/2009 | Lee | G06T 3/4007 382/195 |
| 2009/0079866 A1* | 3/2009 | Namioka | G06T 3/403 348/443 |
| 2009/0129699 A1* | 5/2009 | Beikirch | G06T 5/20 382/279 |
| 2010/0117990 A1* | 5/2010 | Yahata | G06F 3/042 345/175 |
| 2010/0278422 A1* | 11/2010 | Iketani | G06T 3/403 382/165 |
| 2011/0063473 A1* | 3/2011 | Tsunekawa | G06T 3/4015 348/222.1 |
| 2011/0205235 A1* | 8/2011 | Mishima | G06T 7/13 345/581 |
| 2012/0076420 A1* | 3/2012 | Kono | H04N 5/142 382/199 |
| 2015/0221068 A1* | 8/2015 | Martensson | G06T 5/002 382/255 |
| 2016/0247262 A1* | 8/2016 | Li | G06T 3/4007 |
| 2016/0267628 A1* | 9/2016 | Yang | G06T 3/4007 |
| 2017/0098310 A1* | 4/2017 | Chefd'hotel | G06T 7/0012 |
| 2017/0161874 A1* | 6/2017 | Yang | G06T 3/4023 |
| 2018/0082149 A1* | 3/2018 | Shieh | G06K 9/6221 |
| 2018/0146953 A1* | 5/2018 | Jaremko | A61B 8/0875 |

* cited by examiner

IMAGE INTERPOLATION METHODS AND RELATED IMAGE INTERPOLATION DEVICES THEREOF

CROSS REFERENCE TO RELATED APPLICATIONS

This Application claims priority of China Application No. 201710872597.2, filed on Sep. 25, 2017, and the entirety of which is incorporated by reference herein.

BACKGROUND OF THE INVENTION

Field of the Invention

The invention generally relates to image processing, and more particularly, to image interpolation methods and related image interpolation devices based on gradient information.

Description of the Related Art

Image interpolation is a widely used technique in image processing. The most common application is to produce better images with enlarged and shrunken visual effects for displaying and printing. In recent years, with the growth consuming of the multimedia products, the relevant electronic devices for image capture or display has become important products, such as flat-panel displays, digital cameras, etc., in which image interpolation is one of the important functions of core control. The image interpolation is particularly useful when performs operations such as image size adjustment between different pixel coordinate systems, remapping, image correction, image distortion, or image scaling, etc.

The existing image interpolation technique includes linear interpolation methods such as non-directional bi-linear-interpolation method and bi-cubic-interpolation method, which obtains a newly created destination pixel value in the target image by performing calculation of the nearest neighboring pixels (source pixels) of the destination pixel in the source image. For example, in the bi-linear-interpolation method, the newly created destination pixel value in the target image is obtained by performing calculation of the weighted average of the values of the four neighboring pixels in the 2*2 regions near the destination pixel in the source image. In the cubic-interpolation method, the newly created destination pixel value in the target image is obtained by calculating the weighted average of the 16 neighboring pixels in the 4*4 regions near the destination pixel in the source image. Because the linear interpolation method only needs to calculate the nearest neighboring pixels of the destination pixel, resulting in lower complexity, lower computation cost, higher quality of enlarged images and disappearance of the discontinuity of pixel values, so that the linear interpolation method is very wide used in application. However, the linear interpolation method has the properties of low-pass filter, which may cause damage to the high-frequency part, and the details of the interpolated image may appear jagged, especially blurring or artifacts because of overexposure may appear around edges and lines of the interpolated image, which makes viewer has a visual feeling of de-focus. Therefore, it is impossible for the conventional linear interpolation method to keep the computation cost lower while eliminate blurring or artifacts because of overexposure.

BRIEF SUMMARY OF THE INVENTION

Image interpolation methods and related image interpolation devices are provided.

In an exemplary embodiment, an image interpolation method for interpolating a destination pixel of a destination image by using a plurality of source pixels of a source image, performed by an image interpolation device in an image processing system, comprises: selecting the plurality of source pixels from the source image corresponding to the destination pixel; obtaining a gradient direction and a gradient magnitude according to the plurality of source pixels; determining a weight corresponding to each of the plurality of source pixels according to the gradient direction and the gradient magnitude; and performing an interpolation operation according to pixel values of the plurality of source pixels and the weight corresponding to each of the plurality of source pixels to obtain a pixel value of the destination pixel.

Another exemplary embodiment of an image interpolation device for interpolating a destination pixel of a destination image using a plurality of source pixels of a source image, comprising: an interpolation coordinate calculator, an interpolation direction determination device, a weighting coefficient generator and an interpolation calculation unit. The interpolation coordinate calculator is configured to perform a coordinate transformation to select the plurality of source pixels from the source image corresponding to the destination pixel. The interpolation direction determination device is coupled to the interpolation coordinate calculator for obtaining a gradient direction and a gradient magnitude according to the plurality of source pixels. The weighting coefficient generator is coupled to the interpolation direction determination device for determining a weight corresponding to each of the plurality of source pixels according to the gradient direction and the gradient magnitude. The interpolation calculation unit is coupled to the interpolation coordinate calculator and the weighting coefficient generator for performing an interpolation operation based on pixel values of the plurality of source pixels and the weight corresponding to each of the plurality of source pixels to obtain a pixel value of the destination pixel.

Methods disclosed above may be implemented by the disclosed devices or systems which are hardware or firmware capable of performing particular functions and may be in the form of program code embodied in a storage media. When the program code is loaded into and executed by an electronic device, a processor, a computer or a machine, the electronic device, the processor, the computer or the machine becomes the device for implementing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. It should be understood that the embodiments may be realized in software, hardware, firmware, or any combination thereof.

Embodiments of the invention provide an image interpolation method and a related image interpolation device using a gradient-based interpolation filter, which can adjust the linear interpolation function according to the gradient direction when performing an interpolation operation so that the pixels to be interpolated in the direction along the gradient direction have larger weights and the pixels to be interpolated in the direction orthogonal to the gradient direction (i.e., the edge direction) have smaller weights when the interpolation is performed, so as to keep the details of the high frequency portion of the image in the direction along the gradient direction, prevent the edge of the destination image after interpolation from being blurred, and eliminate noise and artifacts, thus effectively making the destination image after interpolation has a better quality.

Figure 1:
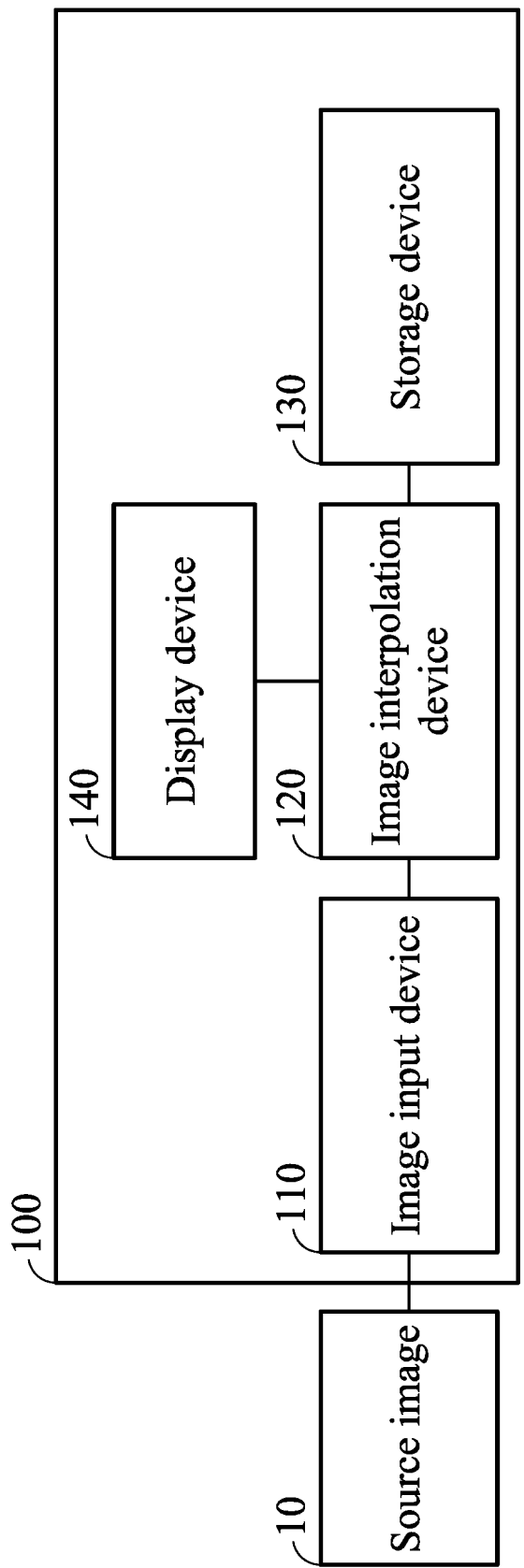
FIG. 1 is a schematic diagram of an image processing system according to an exemplary embodiment.

FIG. 1 is a schematic diagram of an image processing system according to an exemplary embodiment. As shown in FIG. 1, the image processing system 100 may include an image input device 110, an image interpolation device 120, a storage device 130, and a display device 140. The image input device 110 may be configured to receive or acquire a source image 10 and provide the source image 10 to the image interpolation device 120 for subsequent image analyzing and interpolation processing. For example, the image processing system 100 may be a laptop computer, a desktop computer, a tablet device, or other handheld device (e.g., a smartphone), but the invention is not limited thereto. For example, in an embodiment, the image input device 110 may be an image acquisition unit, such as one of an infrared image acquisition device, a Charge Coupled Device (CCD) element or Complementary Metal Oxide Semiconductor (CMOS) sensing element, or any combination thereof, and the invention is not limited thereto. The source image 10 may be a picture, an image or a frame of a video (film) or the like.

The image interpolation device 120, which is coupled to the image input device 110 and the storage device 130, can load the instruction set and/or the programing code from the storage device 130 and execute the instruction set and/or the programing code based on the source image 10 acquired from the image input device 110 or the storage device 130 the details will be described later. Specifically, the image interpolation device 120 uses a linear interpolation method such as a bi-linear or bi-cubic interpolation method, to calculate pixel value of a newly created destination pixel of a destination image 20 according to pixel values of the plurality of source pixels (surrounding the destination pixel) of a source image and the weight corresponding to each of the plurality of source pixels.

Figure 2:
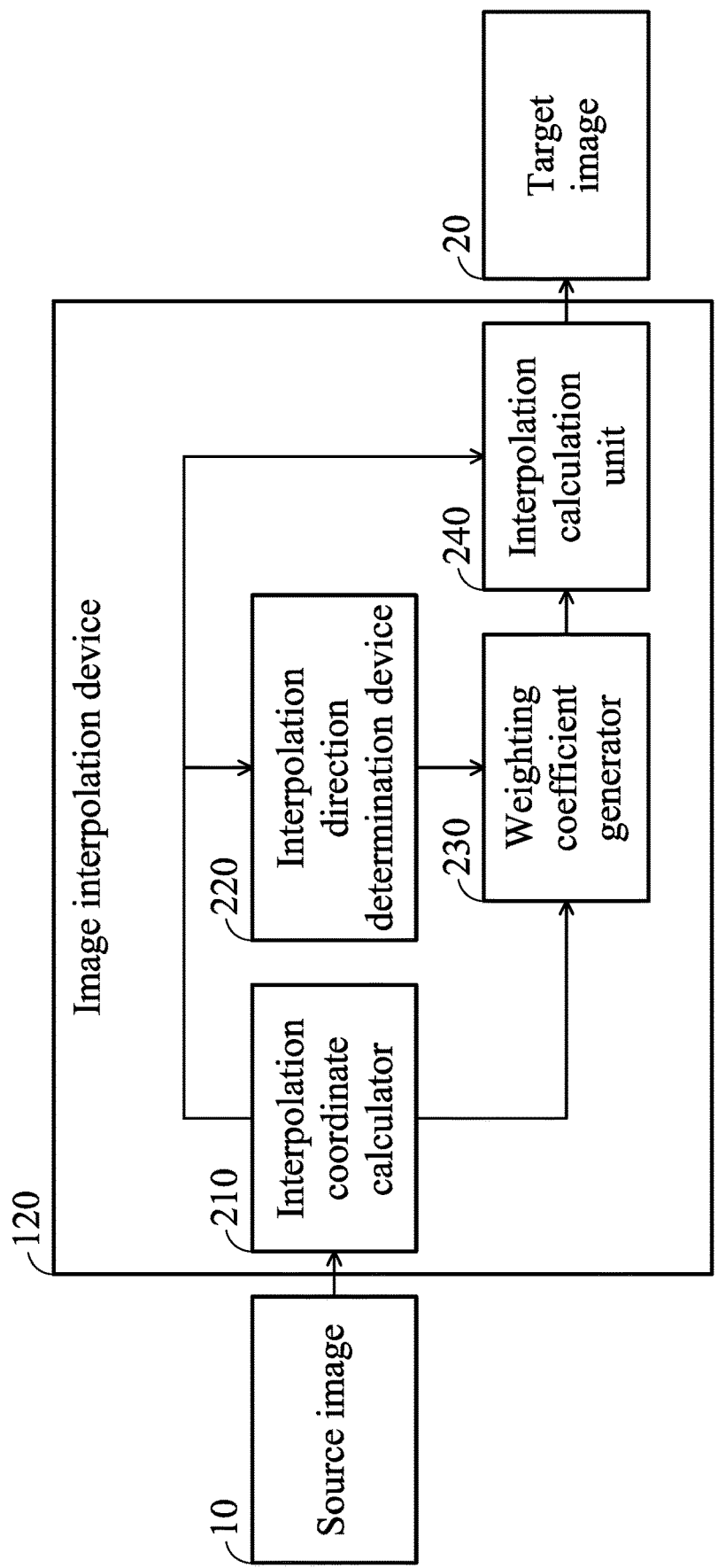
FIG. 2 is a schematic diagram of an image interpolation device according to an exemplary embodiment.

FIG. 2 is a schematic diagram of an image interpolation device according to an exemplary embodiment. As shown in FIG. 2, the image interpolation device 120 includes a plurality of hardware elements including at least an interpolation coordinate calculator 210, an interpolation direction determination device 220, a weighting coefficient generator 230, and an interpolation calculation unit 240. The interpolation coordinate calculator 210 is used for coordinate transformation to select a plurality of source pixels in the source image 10 to be participated in the interpolation calculation according to the position of the destination pixel in the destination image. The interpolation direction determination device 220 is connected to the interpolation coordinate calculator 210 for acquiring the statistical information of the local area based on the plurality of source pixels selected by the interpolation coordinate calculator 210. For example, the interpolation direction determination device 220 may determine the change direction of the image edge based on a threshold value and a series of calculations and further determine the new coordinates. The weighting coefficient generator 230 is connected to the interpolation direction determination device 220 to determine a weight corresponding to each of the plurality of source pixels participating interpolation operation based on the new coordinates determined by the interpolation direction determination device 220 and the adjustment to the size of the interpolation filter. The interpolation calculation unit 240 is connected to the interpolation coordinate calculator 210 and the weighting coefficient generator 230 to perform a weighting calculation according to pixel values of the plurality of source pixels of the source image 10 and the weight corresponding to each of the plurality of source pixels obtained from the weighting coefficient generator 230 to perform the interpolation calculation to obtain the pixel value of the destination pixel of the destination image 20. For example, the image interpolation device 120 may be a general-purpose processor, a Micro-Control Unit (MCU), a Graphics Processing Unit (GPU), a Digital Signal Processor (DSP), or the like, which can perform the function of image data analyzing, processing and interpolation calculation.

In another embodiment, the image interpolation device 200 may further include a post evaluation unit (not shown) for subsequent processing of the results of interpolation, to perform image optimization processing to remove artifacts or sawtooth to further improve the quality of the output image.

The storage device 130 may be a non-volatile storage medium (e.g., Read-Only Memory (ROM), Flash memory, magnetic tape, hard disk, or optical disc), a volatile storage medium (e.g., Random Access Memory (RAM)), or any combination thereof for storing data, such as intermediate data generated during the calculation process and the result data and so on. In some embodiments, the storage device 130 may store the source image(s) 10 in advance, and the image interpolation device 120 may directly access the source image(s) 10 from the storage device 130 for subsequent processing, rather than from the image input device 110.

The display device 140 may be any device capable of displaying or showing image processing results. The display device 140 may display related data, such as texts, figures, interfaces, and/or other types of image processing results. The display device 140, such as a liquid crystal display (LCD) etc., may be configured to display the destination image, i.e., the interpolation processing results (the destination image may be any kind of image format, such as bmp, jpg, png, etc.). It could be understood that, in some embodiments, the display device 140 may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Therefore, users may be able to input commands or signals via the display device 140.

It could be understood that each of the elements or modules in the presented embodiments may be a device having a corresponding function, which may have the appropriate hardware circuits or elements to perform the corresponding function, however, the device is not limited to be entity device, which may also be a virtual device having program codes and software(s) with respective functions or a device having capabilities for processing and running the program codes and software(s). The manner of operations of the respective elements may further refer to the following description of the methods. Specifically, the image processing system 100 may control the operations of the image input device 110, the storage device 130, and the display device 140 via the image interpolation device 120 to perform the image interpolation method of the invention.

Figure 3:
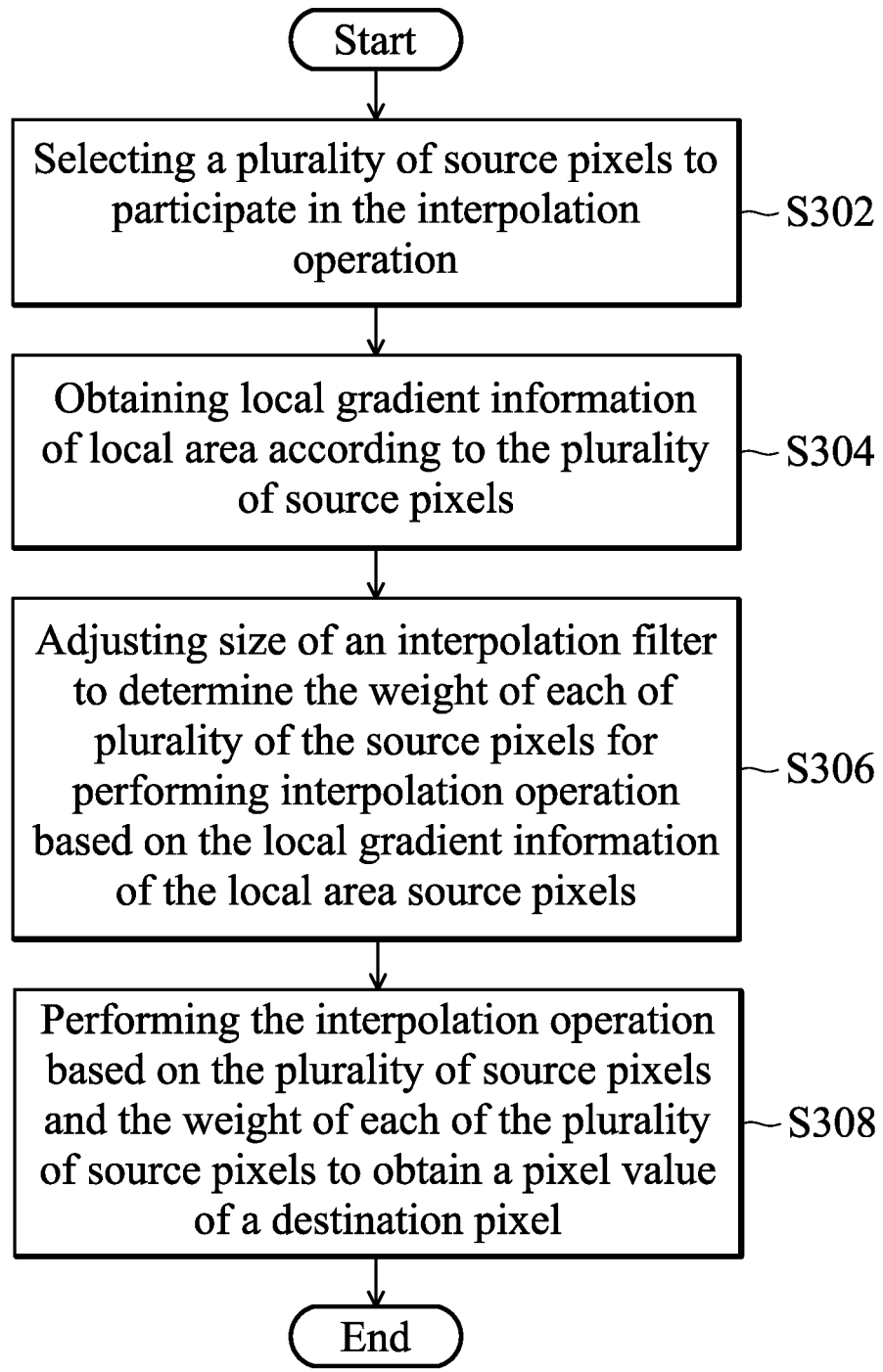
FIG. 3 is a flowchart of an image interpolation method according to an exemplary embodiment of the invention.

FIG. 3 is a flowchart of an image interpolation method according to an exemplary embodiment of the invention. The image interpolation method in accordance with the embodiments of the invention may be applied to an image processing system, for example, the image processing system 100 as shown in FIG. 1, and the method may be performed by the image interpolation device 120. To be more specific, the image interpolation device 120 may perform the image interpolation method of the present invention by controlling the operation of the interpolation coordinate calculator 210, the interpolation direction determination device 220, the weighting coefficient generator 230, and the interpolation calculation unit 240.

First, in step S302, the interpolation coordinate calculator 210 selects a plurality of source pixels from the source image to participate in the interpolation operation. Specifically, the interpolation coordinate calculator 210 may firstly obtain the source image 10 from the image input device 110 or the storage device 130 and select the plurality of source pixels to participate in the interpolation operation based on the position of the destination pixel. In this embodiment, the pixel value of each destination pixels of the destination image is unknown, and the pixel value of each source pixels of the source image is known. Besides, there is a coordinate transformation relationship between the destination pixels and the source pixels. For a destination pixel P of the destination image, assuming the coordinates of pixel P in destination image are (x_dst, y_dst), the interpolation coordinate calculator 210 can firstly obtain coordinates (x_src, y_src) of the target pixel P in the source image based on the coordinate transformation relationship, and then take n×n pixels around (x_src, y_src) as the pixels to participate in the interpolation calculation, where the value of n may be vary because of the needs of the different interpolation methods. In one embodiment, the interpolation coordinate calculator 210 may select 5*5 (i.e., n=5) source pixels nearest neighboring to the position of the destination pixel in the source image 10 as source pixels to participate in the interpolation calculation, but the invention is not limited thereto. For example, taking the image scaling as an example, assuming that the width and the height of the source image are WidthSrc and HeightSrc respectively and the width and height of the destination image are WidthDst and HeightDst respectively. Then, the coordinates (x_src, y_src) in the source image of the destination pixel P (x_dst, y_dst) can be obtained based on the following coordinate transformation relationship:

$x\_src = Ratiox * x\_dst;$ $y\_src = Ratioy * y\_dst;$ where Ratiox=WidthSrc/WidthDst, and Ratioy=HeightSrc/HeightDst.

Then, in step S304, according to the plurality of source pixels selected by the interpolation coordinate calculator 210, the interpolation direction determination device 220 obtains local gradient information of a local area, to determine the change direction of the image edge. The local gradient information includes a gradient direction and a gradient magnitude. The gradient direction can be used to represent the direction of the change of the image edge, and the gradient magnitude represents a degree of the change of the image edge. The direction of the image edge can be defined as the normal direction of image edge. More specifically, the gradient direction and the gradient magnitude can be the gray scale gradient direction and the gray scale gradient intensity calculated based on the gray scale value of image.

In step S304, the interpolation direction determination device 220 may firstly calculate the gradient direction, and take the gradient direction as the interpolation direction. In one embodiment, the calculation of the gradient direction may include the calculation of gradient values of the four direction edge operators: a horizontal gradient value edgeH, a vertical gradient value edgeV, a left oblique gradient edgeL, and a right oblique gradient value edgeR; and the determination of the gradient direction according to the proportional relationship among the gradient values of the four direction edge operators. For more specifically, the four direction edge operators can be obtained by calculating the predetermined horizontal gradient operator GH, vertical gradient operator GV, left oblique gradient operator GL and right oblique gradient operator GR. In one embodiment, the horizontal gradient operator GH, the vertical gradient operator GV, the left gradient operator GL, and the right oblique gradient operator GR may be preset as following:

$$GH = \begin{bmatrix} 1 & 2 & 0 & -2 & -1 \\ 2 & 4 & 0 & -4 & -2 \\ 4 & 8 & 0 & -8 & -4 \\ 2 & 4 & 0 & -4 & -2 \\ 1 & 2 & 0 & -2 & -1 \end{bmatrix} \quad GV = \begin{bmatrix} 1 & 2 & 4 & 2 & 1 \\ 2 & 4 & 8 & 4 & 2 \\ 0 & 0 & 0 & 0 & 0 \\ -2 & -4 & -8 & -4 & -2 \\ -1 & -2 & -4 & -2 & -1 \end{bmatrix}$$

$$GL = \begin{bmatrix} 0 & -1 & 2 & -1 & -1 \\ 1 & 0 & -4 & -8 & -1 \\ 2 & 4 & 0 & -4 & -2 \\ 1 & 8 & 4 & 0 & -1 \\ 1 & 1 & 2 & 1 & 0 \end{bmatrix} \quad GR = \begin{bmatrix} -1 & -1 & -2 & -1 & 0 \\ -1 & -8 & -4 & 0 & 1 \\ -2 & -4 & 0 & 4 & 2 \\ -1 & 0 & 4 & 8 & 1 \\ 0 & 1 & 2 & 1 & 1 \end{bmatrix}.$$

For example, assuming that Srcwindow [5][5] is defined as the 5×5 source pixels in the source image used to calculate the destination pixel, the horizontal gradient value edgeH can be obtained by the following formula:

edgeH=GH*Srcwindow;

where * denotes a convolution operation.

Similarly, the vertical gradient value edgeV, the left gradient value edgeL, and the right oblique gradient value edgeR can be obtained by convolution of GV, GL, GR, and Srcwindow, respectively, that is:

edgeV=GV*Srcwindow;

edgeL=GL*Srcwindow; and edgeR=GR*Srcwindow.

It should be noted that the preset values of the gradient operators GH, GV, GL, GR are just one embodiment, and the present invention is not limited thereto. For example, in another embodiment, the gradient operators GH, GV, GL, GR can also be preset as following:

$$GH = \begin{bmatrix} 1 & 0 & -1 \\ 2 & 0 & -2 \\ 1 & 0 & -1 \end{bmatrix} GL = \begin{bmatrix} 0 & -2 & -1 \\ 2 & 0 & -2 \\ 1 & 2 & 0 \end{bmatrix} GV = \begin{bmatrix} 1 & 2 & 1 \\ 0 & 0 & 0 \\ -1 & -2 & -1 \end{bmatrix}$$

$$GR = \begin{bmatrix} -1 & -2 & 0 \\ -2 & 0 & 2 \\ 0 & 2 & 1 \end{bmatrix}.$$

In another embodiment, the interpolation direction determination device 220 may also obtain the four gradient operators based on the following two optimized combinatorial filter, which may be preset as following:

$$combineHV = \begin{bmatrix} 1 & 2 & 4 & 2 & 1 \\ 2 & 4 & 8 & 4 & 2 \\ 4 & 8 & -84 & 8 & 4 \\ 2 & 4 & 8 & 4 & 2 \\ 1 & 2 & 4 & 2 & 1 \end{bmatrix} combineLR = \begin{bmatrix} 1 & 1 & 2 & 1 & 1 \\ 1 & 8 & 4 & 8 & 1 \\ 2 & 4 & 0 & 4 & 2 \\ 1 & 8 & 4 & 8 & 1 \\ 1 & 1 & 2 & 1 & 1 \end{bmatrix}$$

Next, the interpolation direction determination device 220 determines the gradient direction according to the proportional relationship among the gradient values of the four direction edge operators. In one embodiment, the step of determining the gradient direction may include the following steps: dividing the gradient direction into a plurality of edge regions according to angles; classifying the two edge regions whose directions orthogonal to each other into the same class to generate a plurality of classes; and selecting one of the plurality of classes as the gradient direction according to the proportional relationship of the gradient values.

In one embodiment, the number of edge regions can be 8 and the number of classes is 4. In other words, the gradient directions are divided into eight edge regions and four classes. It should be noted that the division of gradient directions into four classes is just an embodiment in consideration of calculation cost o and the quality of the images. However, the invention is not limited thereto. In another embodiment, the gradient directions can also be divided into other number of classes, such as six classes and so on.

Figure 4:
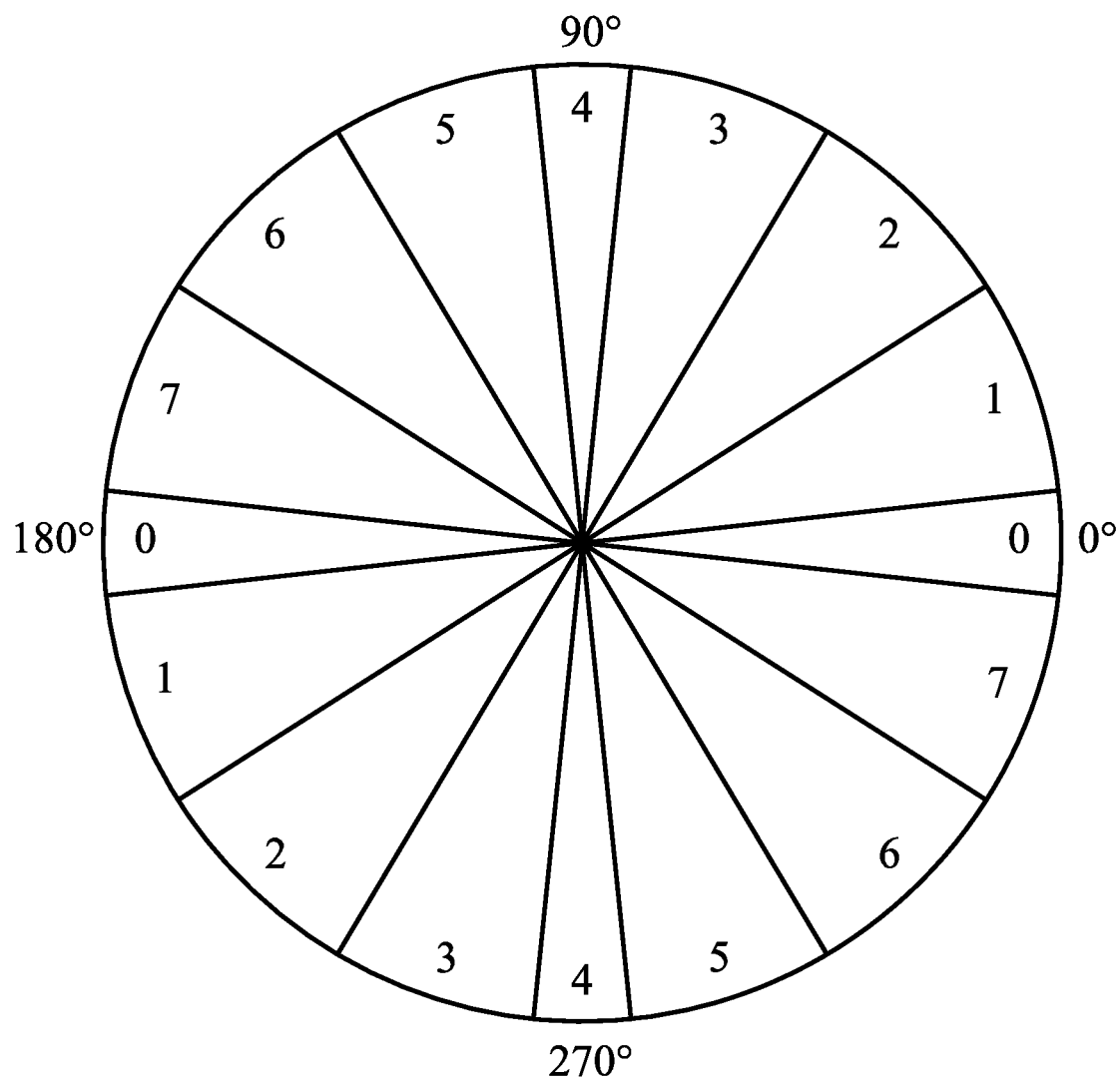
FIG. 4 is a schematic diagram illustrating an exemplary edge region according to an embodiment.

FIG. 4 is a schematic diagram illustrating an exemplary edge region according to an embodiment. As shown in FIG. 4, the edge directions are divided into eight edge regions 0~7 in 8 different discrete directions based on the angles. For example, the edge region 0 is determined by two lines with 0 degree angle and 180 degree angle, the edge region 1 is determined by two lines with 19 degree angle and 199 degree angle, the edge region 2 is determined by two lines with 45 degree angle and 225 degree angle, the edge region 3 is determined by two lines with 71 degree angle and 251 degree angle, the edge region 4 is determined by two lines with 90 degree angle and 270 degree angle, the edge region 5 is determined by two lines with 109 degree angle and 289 degree angle, the edge region 6 is determined by two lines with 135 degree angle and 315 degree angle, and the edge region 7 is determined by two lines with 161 degree angle and 341 degree angle. As can be seen from FIG. 4, when the position of the pixel belongs to the edge region 0, indicating the pixel is a non-edge pixel or a horizontal edge pixel; when the position of the pixel belongs to the edge region 1, indicating the pixel is a left horizontal edge pixel; when the position of the pixel belongs to the edge region 2, indicating the pixel is a left oblique edge pixel; when the position of the pixel belongs to the edge region 3, indicating the pixel is a left vertical edge pixel; when the position of the pixel belongs to the edge region 4, indicating the pixel is a vertical edge pixel; when the position of the pixel belongs to the edge region 5, indicating the pixel is a right vertical edge pixel; when the position of the pixel belongs to the edge region 6, indicating the pixel is a right oblique edge pixel; and when the position of the pixel belongs to the edge region 7, indicating the pixel is a right horizontal edge pixel.

In this embodiment, the gradient directions are divided into eight directions and edge regions orthogonal to each other in the edge regions are classified into the same type. For example, the edge region 0 and the edge region 4 are orthogonal to each other, and they are classified into a first class (class I). Similarly, the edge region 2 and the edge region 6 are orthogonal to each other, and they are classified into a second class (class II); the edge region 1 and the edge region 5 are orthogonal to each other, and they are classified into a third class (class III); the edge region 3 and the edge region 7 are orthogonal to each other, and they are classified into a fourth class (class IV). For purpose of illustration, the first class is also referred to as the forward gradient, the second class is also referred to as the oblique gradient, and the third class and the fourth class are also referred to as the middle gradient.

Therefore, the determination of the gradient direction of the pixel according to the proportional relationship among the gradient values of the four direction edge operators may firstly determine whether the gradient direction of the pixel belongs to one of the following classes based on the proportional relationship between edgeR and edgeL: the forward gradient A, the oblique gradient B, or middle gradient C. When the gradient direction of the pixel belongs to the forward gradient A, indicating the pixel belongs to the first class, so its edge region is the edge region 0 or the edge region 4. When the gradient direction of the pixel belongs to the oblique gradient B, indicating the pixel belongs to the second class, so its edge region is the edge region 2 or the edge region 6. When the gradient direction of the pixel belongs to the middle gradient C, the proportional relationship between edgeH and edgeV can be applied to determine the gradient direction of the pixel belongs to which one of the following classes: the third class (the edge region 1 or the edge region 5) or the fourth class (the edge region 3 or the edge region 7). Details of the determination of the gradient direction will be disclosed with FIG. 5A to FIG. 5D.

FIGS. 5A to 5D show a flowchart of a method for determining the gradient direction according to an exemplary embodiment of the invention. The method for determining the gradient direction in accordance with the embodiments of the invention may be applied to an image processing system, for example, the image processing system 100 as shown in FIG. 1, and the method may be performed by the interpolation direction determination device 220 of the image interpolation device 120.

Firstly, the interpolation direction determination device 220 calculates the gradient values of the four directional edge operators: the horizontal gradient value edgeH, the vertical gradient value edgeV, the left oblique gradient value edgeL and the right oblique gradient value edgeR (step S502). The horizontal gradient value edgeH, the vertical gradient value edgeV, the left oblique gradient value edgeL and the right gradient value edgeR may be obtained by performing convolution operation based on the pixel values of the selected 5×5 source pixels and gradient operators GH, GV, GL and GR, respectively.

Thereafter, the interpolation direction determination device 220 determines whether the maximum gradient value of absolute values of the horizontal gradient value edgeH, the vertical gradient value edgeV, the left oblique gradient value edgeL, and the right oblique gradient edgeR is smaller than a predetermined threshold value (step S504). If so, the interpolation direction determination device 220 determines that the pixel is a non-edge pixel (step S506) and determines that the flow ends and starts the determination flow of the type of the next pixel (if any). On the other hand, if the maximum value is greater than or equal to the predetermined threshold value (No in step S504), the interpolation direction determination device 220 then determines whether the edgeR and edgeL conform to a first proportional relationship (step S508). For example, in one embodiment, the first proportional relationship may be related to a multiple relationship between the absolute value of edgeR and the absolute value of edgeL, but the invention is not limited thereto. If so, it indicates that the value of the edgeL is close to the value of edgeR, and then the interpolation direction determination device 220 determines whether edgeH and edgeV conform to a second proportional relationship (step S510). For example, in one embodiment, the second proportional relationship may be related to the proportional relationship between the absolute value of edgeH and the absolute value of edgeV, but the invention is not limited thereto. If so, the interpolation direction determination device 220 determines that the pixel is a horizontal edge pixel, and determines that the gradient direction of the pixel belongs to the edge region 0 and the determination flow ends (step S512).

If the edgeH and edgeV do not conform to the second proportional relationship, the interpolation direction determination device 220 determines whether the edgeV and edgeH conform to the third proportional relationship (step S514). For example, in one embodiment, the third proportional relationship may be related to the proportional relationship between the absolute value of edgeV and the absolute value of edgeH, but the invention is not limited thereto. If so, the interpolation direction determination device 220 determines that the pixel is a vertical edge pixel, and determines that the gradient direction of the pixel belongs to the edge region 4 and the determination flow ends (step S516).

If the edgeV and edgeH do not conform to the third proportional relationship, then the interpolation direction determination device 220 determines whether the edgeR, edgeV, edgeH, and edgeL conform to a fourth proportional relationship (step S518). For example, in one embodiment, the fourth proportional relationship may be related to the magnitude relationship between the absolute value of the edgeR and the absolute value of the edgeL and the sign relationship between the edgeV and the edgeH, but the invention is not limited thereto. If so, the interpolation direction determination device 220 then determines whether the absolute value of the edgeH is greater than the absolute value of the edgeV (step S520). If so, the interpolation direction determination device 220 determines that the pixel is a horizontal right edge pixel and it determines that the gradient direction of the pixel belongs to the edge region 7 and the determination flow ends (step S522). If not, the interpolation direction determination device 220 determines that the pixel is a vertical-right edge pixel, and determines that the gradient direction of the pixel belongs to the edge region 5 and the determination flow ends (step S524).

Referring back to step S518, if the edgeR, edgeV, edgeH, and edgeL do not conform to the fourth proportional relationship (No in step S518), the interpolation direction determination device 220 then determines whether the edgeR, edgeV, edgeH, and edgeL conform to a fifth proportional relationship (step S526). For example, in one embodiment, the fifth proportional relationship may be related to the magnitude relationship between the absolute value of the edgeL and the absolute value of the edgeR and the sign relationship between the edgeV and the edgeH, but the invention is not limited thereto. If the edgeR, edgeV, edgeH, and edgeL do not conform to a fifth proportional relationship, the interpolation direction determination device 220 determines whether the absolute value of the edgeH is greater than the absolute value of the edgeV (step S528). If the absolute value of the edgeH is greater than the absolute value of the edgeV (Yes in step S528), the interpolation direction determination device 220 determines that the pixel is a horizontal-left edge pixel, and therefore determines that the pixel's gradient direction belongs to the edge region 1 and the determination flow ends (step S530). If the absolute value of the edgeH is less than or equal to the absolute value of the edgeV (No in step S528), the interpolation direction determination device 220 determines that the pixel is a vertical-left edge pixel, and therefore determines that the gradient direction of the pixel belongs to the edge region 3 and the determination flow ends (step S532).

Referring back to step S518, if the edgeR, edgeV, edgeH, and edgeL do not conform the fifth proportional relationship (No in step S526), the interpolation direction determination device 220 then determines whether the gradient magnitude Diff and the maximum gradient value of the absolute values of edgeR, edgeV, edgeH, and edgeL conform to a sixth proportional relationship (step S534). For example, in one embodiment, the sixth proportional relationship may be related to the magnitude relationship between the gradient magnitude Diff and the multiple of the maximum gradient value of the absolute values of edgeR, edgeV, edgeH, and edgeL, but the invention is not limited thereto. It should be noted that the calculation of the gradient magnitude Diff will be described in the following description. If so (Yes in step S534), the interpolation direction determination device 220 determines that the pixel is a noise pixel, and determines that the gradient direction of the pixel belongs to the edge region 0 and the determination flow ends (step S536); and if not (No in step S534), it determines that the pixel is a non-edge pixel, and determines that the gradient direction of the pixel belongs to the edge region 0 and the determination flow ends (step S538).

Figure 5A:
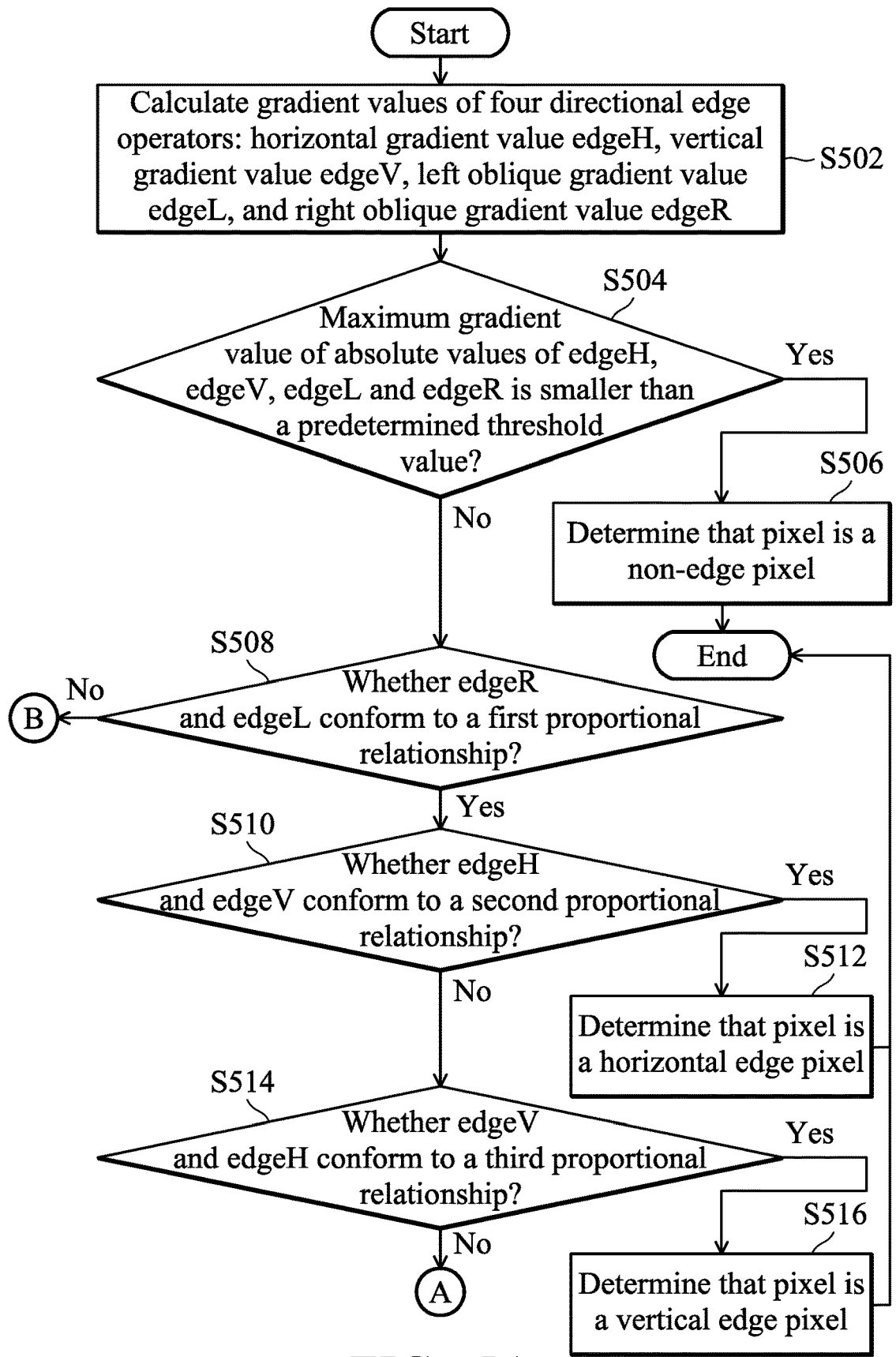
FIGS. 5A to 5D show a flowchart of a method for determining the gradient direction according to an exemplary embodiment of the invention.
Figure 5B:
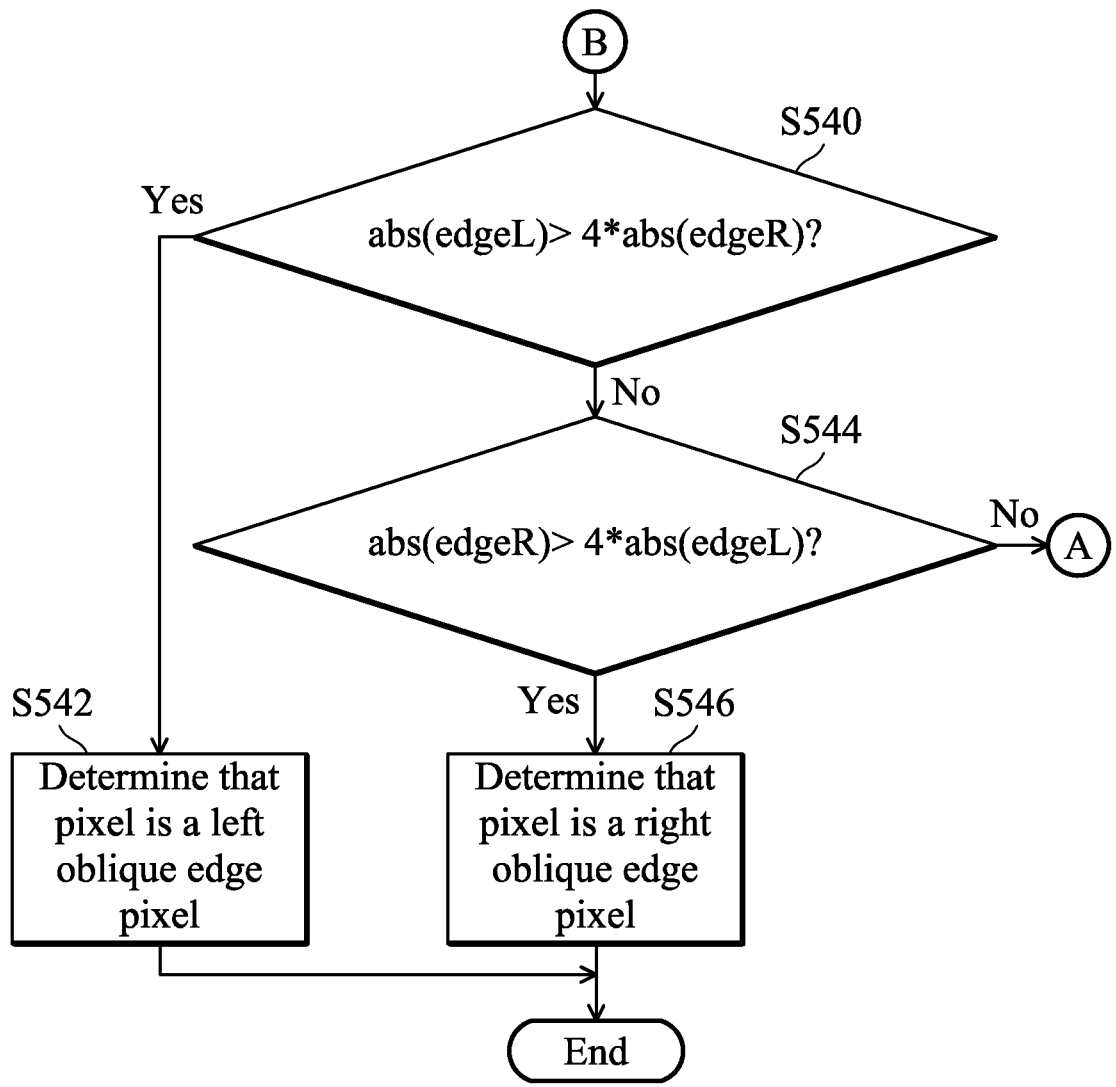
Figure 5C:
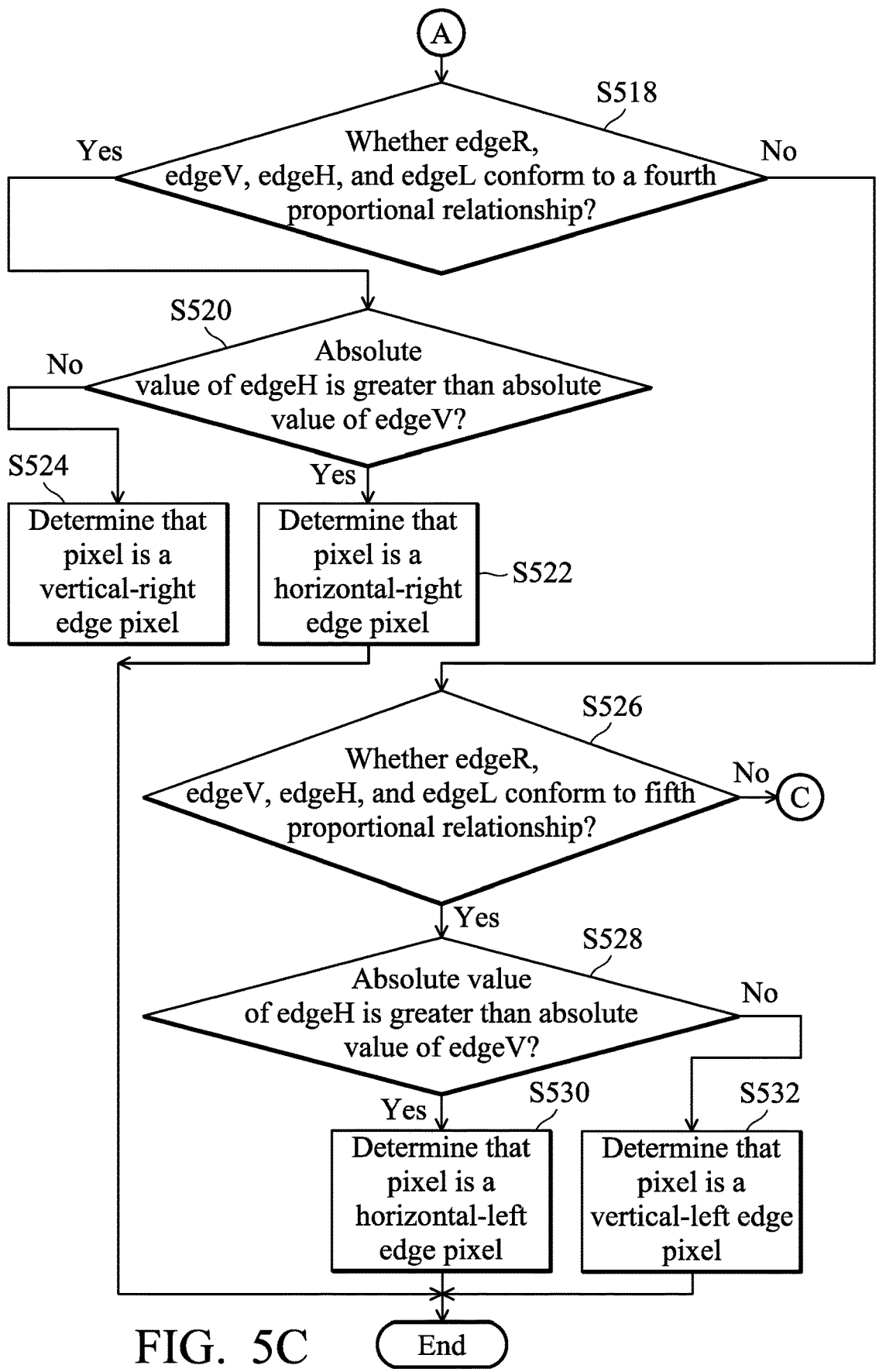
Figure 5D:
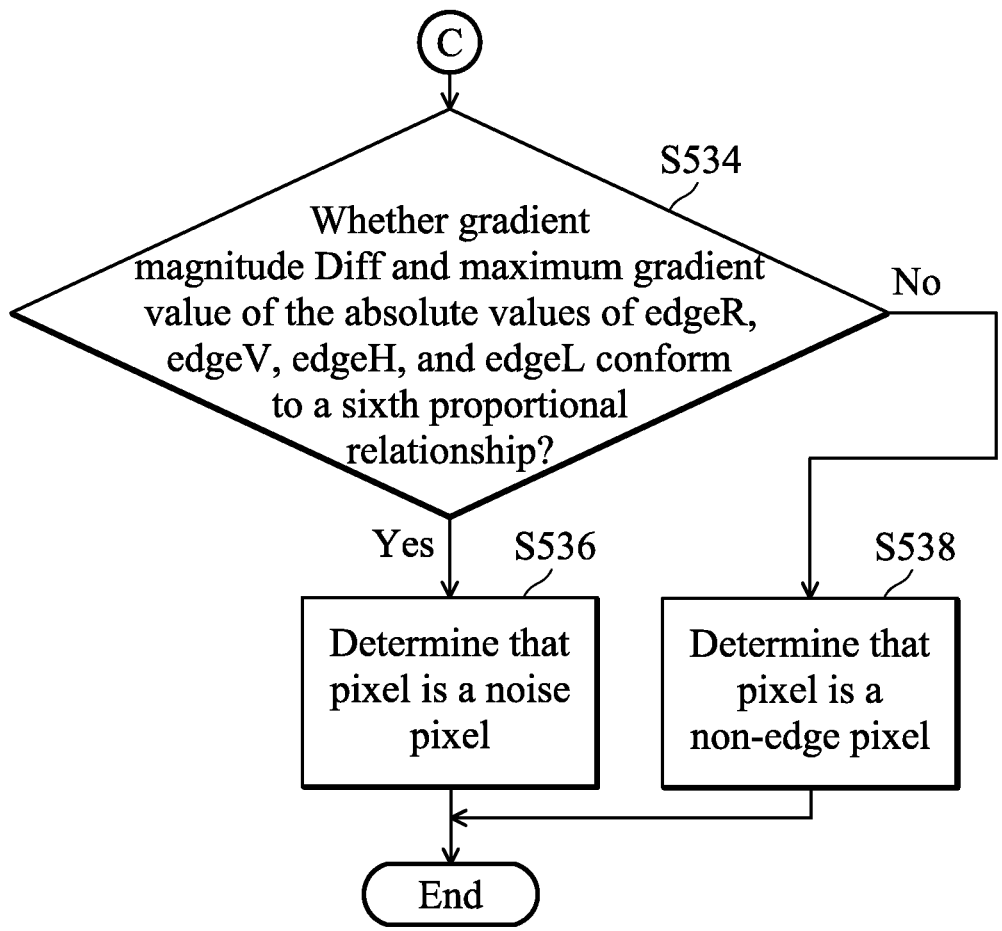

Referring back to step S508, if the edgeR and the edgeL do not conform to the first proportional relationship (No in step S508), the interpolation direction determination device 220 then determines whether the absolute value of edgeL is greater than four times the absolute value of edgeR (step S540). If the absolute value of the edgeL is greater than four times the absolute value of the edgeR (Yes in step S540), the interpolation direction determination device 220 determines that the pixel is a left oblique edge pixel, and determines that the gradient direction of the pixel belongs to the edge region 2 and the determination flow ends (step S542). If the absolute value of the edgeL is less than or equal to four times the absolute value of the edgeR (No in step S540), the interpolation direction determination device 220 determines whether the absolute value of edgeR is greater than four times the absolute value of edgeL (step S544). If so (Yes in step S544), the interpolation direction determination device 220 determines that the pixel is a right oblique edge pixel, and determines that the gradient direction of the pixel belongs to the edge region 6 and the determination flow ends (step S546). On the other hand, if the absolute value of the edgeR is less than or equal to four times the absolute value of the edgeL (No in step S544), the interpolation direction determination device 220 then jumps to the aforementioned step S518 and then performs the determination steps of the steps S520 to S538 to determine the position of the pixel so as to determine one of the edge regions 0, 1, 3, 5, and 7 as the gradient direction (as shown in FIG. 5C and FIG. 5D). It should be noted that the four times used in the above-described steps S540 and S544 are only one embodiment of the multiple relationship determined based on the edge range, and in other embodiments, other multiple factors such as 3.5 times can also be used.

Referring again to FIG. 3, after determining the gradient direction change of the image edge in step S306, the weighting coefficient generator 230 then adjusts the size of an interpolation filter for performing interpolation operation based on the local gradient information of the local area, to determine the weight of each source pixel to be interpolated. Particularly, the weight of each source pixel is determined by the distance between each source pixel with the center pixel, that is, by the two kinds of distance, i.e., a distance along the edge direction and a distance along the direction orthogonal to the edge direction (gradient direction).

In some embodiments, the weighting coefficient generator 230 may determine the corresponding weight of each source pixel according to the local gradient information, which may include the following steps: obtaining an edge direction according to the local gradient information; performing a coordinate transformation to convert each source pixel from an image coordinate system (a first coordinate system) to a second coordinate system corresponding to the edge direction, wherein the X-axis of the second coordinate system runs in the direction along the gradient direction and the Y-axis of the second coordinate system runs in the direction along the edge direction, a first component dx in the second coordinate system represents the distance between the source pixel and the X-axis (along the gradient direction) and a second component dy in the second coordinate system represents the distance between the source pixel and the Y-axis (along the edge direction); and determining the weight corresponding to the source pixel according to the first component dx and the second component dy.

For example, in one embodiment, assuming that the coordinates of the source pixel P are (x_src, y_src), the distance along the edge direction is dx, the distance along the direction orthogonal to the edge direction (gradient direction) is dy and the bi-cubic interpolation method is utilized, and the weight of the source pixel P can be calculated by:

$$Rc(dx)*Rc(dy),$$

where Rc (x) can be calculated by:
where $$R^{Rc(x)} = \frac{1}{6} \begin{cases} (12-9B-6C)|x|^3 + (-18+12B+6C)|x|^2 + \\ \quad (6-2B) & \text{if } |x| < 1 \\ (-B-6C)|x|^3 + (6B+30C)|x|^2 + \\ \quad (-12B-48C)|x| + (8B+24C) & \text{if } 1 \le |x| < 2 \\ 0 & \text{otherwise} \end{cases}.$$

That is, the smaller the distance dx, dy, the greater the weight is. It should be understood that the above formula for calculating the weight is only one embodiment of the present invention, the formula for calculating the weight can be replaced by another calculation formula, and the invention is not limited thereto. For example, in another embodiment, the bi-linear interpolation function Rc (x) can also be calculated by:

$$Rc(x) = \begin{cases} 1-x, & \text{if } 0 \le |x| < 1 \\ 0, & \text{otherwise} \end{cases}.$$

For the source pixel whose edge direction belongs to Class I, because the edge direction is horizontal or vertical, the interpolation of the source pixel is the same as the conventional bi-cubic interpolation. If the plurality of source pixels to participate in the calculation using one of the upper left corner of the plurality of source pixels closest to the destination pixel on the source image after coordinate transformation as a reference pixel, to form a sampling window with m columns and n rows (m=0~m−1, n=0~n−1), and then dx and dy can be defined as follows:

$$\begin{cases} dx(m,n) = (p+m-1) \\ dy(m,n) = (q+n-1) \end{cases},$$

where p and q respectively represents a horizontal distance and a vertical distance between the destination pixel and the reference pixel in the first coordinate system. The dx(m, n) represents the horizontal distance between the source pixel at the $m^{th}$ column and $n^{th}$ row of the sampling window and the destination pixel along the aforementioned horizontal axis, and dy(m, n) represents the vertical distance between the source pixel at the $m^{th}$ column and $n^{th}$ row of the sampling window and the destination pixel along the aforementioned vertical axis. The determination of the above-mentioned one of the upper left corner of source pixels in the source image closest to the destination pixel as a reference pixel will be described as the following: finding out multiple (such as 2×2) source pixels closest to the destination pixel (Note that if the position of the destination pixel coincides with the position where the source pixel is located, then the distance between the position of the destination pixel and the position of the source pixel is set as 0, and in this embodiment, 0 may also be referred to as a kind of distance, that is, the minimum distance); selecting a source pixel located in the upper left corner of the above-mentioned multiple source pixels as the reference pixel.

Take the method of bi-cubic interpolation for example, the distances between each destination pixel and its neighboring 4×4 source pixels need to be calculated, so these source pixels form a sampling window with 4 rows and 4 columns with a center pixel, where p and q respectively represents the horizontal distance and the vertical distance between the destination pixel and the center pixel in the first coordinate system. The center pixel may be the source pixel closest to the destination pixel and located in the upper left corner. The center pixel may be the reference pixel. In this embodiment, assuming that $Pixel_{out}$ (x_dst, y_dst) represents the pixel value of the pixel whose coordinates are (x_dst, y_dst) in the destination image, $Pixel_{in}$ (x_src, y_src) represents the pixel value of the pixel whose coordinates are (x_src, y_src) in the source image, wherein the source pixel (x_src, y_src) is in the upper left corner closest to the destination pixel (x_dst, y_dst) after coordinate transformation. The horizontal distance between the source pixel and destination pixel is p, the vertical distance between the source pixel and destination pixel is q. Take pixels from $(x\_src-1)^{th}$ column to $(x\_src+2)^{th}$ column and from $(y\_src-1)^{th}$ row to $(y\_src+2)^{th}$ row to form a 4×4 sampling window, m and n respectively represent the column position and row position of each source pixel in the 4×4 window, m={0,1,2,3}, n={0,1,2,3}, and the dx(m, n) represents the distance between the source pixel on the $m^{th}$ column and the $n^{th}$ row and the destination pixel along the x-axis direction, the dy(m, n) represents the distance between the source pixel on the $m^{th}$ column and the $n^{th}$ row and the destination pixel along the y-axis direction. In some embodiments, the size of the sampling window may not be set to 4×4, such as it may be set to 5×5. In some embodiments, the multiple source pixels participating in the interpolation calculation may also use one of the multiple source pixels after coordinate transformation in upper right, lower right, or lower left corner closest to the destination pixel as a reference pixel.

For source pixel whose edge direction belongs to ClassII, ClassIII or ClassIV, assuming perform the same interpolation calculation as the method of the bi-cubic-interpolation calculation, which may result in zigzag pixels or zigzag artifacts because of not performing interpolation along the edge direction. Therefore, following formulas may be used for calculation for pixels whose edge direction belong to the second class (ClassII), the third class (ClassIII) or the fourth class (ClassIV):

$$\begin{cases} dx(m,n) = \dfrac{(p+m-1)\cos(\theta_i) - (q+n-1)\sin(\theta_i)}{\sin(\theta_i) + \cos(\theta_i)} \\ dy(m,n) = \dfrac{(p+m-1)\sin(\theta_i) + (q+n-1)\cos(\theta_i)}{\sin(\theta_i) + \cos(\theta_i)} \end{cases},$$

where m and n respectively represent the corresponding column position and row position in the above-mentioned sampling window formed based on the above-mentioned source pixels, p and q respectively represent a horizontal distance and a vertical distance of the destination pixel and the reference pixel in the above-mentioned first coordinate system, dx(m, n) represents a horizontal distance between the source pixel on the $m^{th}$ column and the $n^{th}$ row of the sampling window and the destination pixel in the second coordinate system, dy(m, n) represents a vertical distance between the source pixel on the $m^{th}$ column and the $n^{th}$ row of the sampling window and the destination pixel in the second coordinate system, and i represents an edge region number, $\Theta_i$ represents the angle value of the edge region.

For example, in the embodiment, assuming that the values of i are 0 to 7 and $\Theta_1$ to $\Theta_7$ respectively represent the angle values of the edge regions 1 to 7, the values of $\Theta_1$ to $\Theta_7$ can be set to (19°, 45°, 19°, 71°, 109°, 135°, 171°).

Figure 6A:
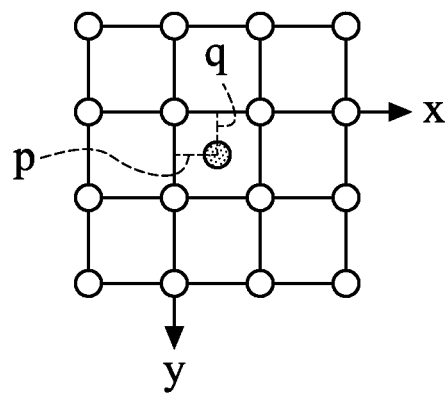
FIG. 6A is a schematic diagram illustrating an exemplary image coordinate system according to an embodiment.
Figure 6B:
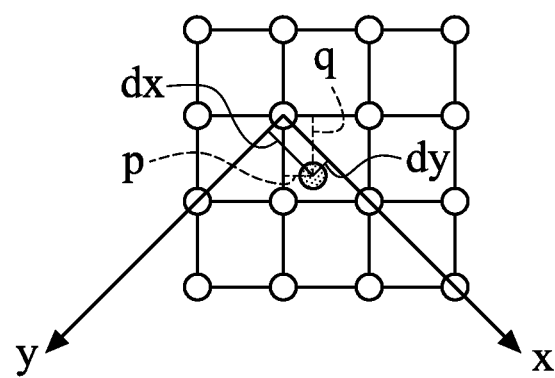
FIG. 6B is a schematic diagram illustrating an exemplary edge coordinate system according to an embodiment.

Specifically, the weighting coefficient generator 230 may first decompose the distance (p, q) of each source pixel under the image coordinate system (first coordinate system) (as shown in FIG. 6A) into the coordinates (dx, dy) under the edge coordinate system (second coordinate system), wherein the x-axis of the edge coordinate system is along the gradient direction, the y-axis of the edge coordinate system is along the edge direction, wherein the gradient direction is orthogonal to the edge direction, dx represents the distance value the horizontal direction (x-axis direction) after the coordinate transformation, and dy represents the distance value along the vertical direction (y-axis direction) after the coordinate transformation (as shown in FIG. 6B). In other words, dx represents the distance along the gradient direction, and dy represents the distance along the direction orthogonal to the gradient direction (i.e., along the edge direction).

Next, the weighting coefficient generator 230 adjusts the filter size to adjust the size of an interpolation filter (e.g., a cubic filter) for performing interpolation operation. In some embodiments, the weight of the source pixel determined by the weighting coefficient generator 230 based on the first component dx and the second component dy may further comprise the following steps: adjusting the size of the interpolation filter based on the first component dx and the second component dy and determining the weight of the source pixel according to the size of the interpolation filter after being adjusted.

To be more specific, the adjustment of the size of the interpolation filter may include the following steps: calculating the gradient magnitude Diff, and then analyzing the gradient characteristics to obtain adjustment groups according to the gradient magnitude Diff, and determining the adjustment magnitude $adjust_{similarity}$ according to intensity value corresponding to the adjustment group.

For example, assuming that Srcwindow [M] [N] is defined as M×N source pixels in the source image corresponding to the destination pixel, the gradient magnitude Diff can be obtained by the following formula:

Diff=CombineHV[M][N]*Srcwindow[M][N], where * represents a convolution operation, CombineHV [M][N] is a gradient operator. In one embodiment, if both M and N have a value of 5, CombineHV [5] [5] can be preset as follows:

$$combineHV = \begin{bmatrix} 1 & 2 & 4 & 2 & 1 \\ 2 & 4 & 8 & 4 & 2 \\ 4 & 8 & -84 & 8 & 4 \\ 2 & 4 & 8 & 4 & 2 \\ 1 & 2 & 4 & 2 & 1 \end{bmatrix}.$$

Figure 7:
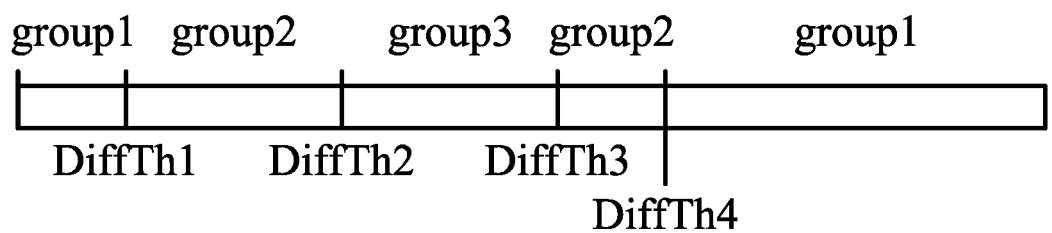
FIG. 7 is a schematic diagram illustrating an exemplary relationship between the gradient magnitude Diff and the adjustment groups according to an embodiment of the invention.

Next, the weighting coefficient generator 230 divide three adjustment groups with different adjustment magnitude by analyzing the gradient characteristics according to a comparison of the gradient magnitude Diff and one or more threshold values. Refer to FIG. 7. FIG. 7 is a schematic diagram illustrating an exemplary relationship between the gradient magnitude Diff and the adjustment groups according to an embodiment of the invention. As shown in FIG. 7, when the gradient magnitude Diff is less than the threshold value DiffTh1 or the gradient magnitude Diff is greater than the threshold value DiffTh4, the corresponding adjustment group is the group1; when the gradient magnitude Diff is between the threshold value DiffTh1 and the threshold value DiffTh2 or the gradient magnitude Diff is between the threshold value DiffTh3 and the threshold value DiffTh4, the corresponding adjustment group is the group2; and when the gradient magnitude Diff is between the threshold value DiffTh1 and the threshold value DiffTh2 or the gradient magnitude Diff is between the threshold value DiffTh2 and the threshold value DiffTh3, the corresponding adjustment group is the group3. In this embodiment, the threshold value DiffTh1 is set to 2*DiffTh, the threshold value DiffTh2 is set to 6*DiffTh, the threshold value DiffTh3 is set to 10*DiffTh, and the threshold value DiffTh4 is set to 12*DiffTh, wherein the threshold value DiffTh is set to be 4. For example, if the gradient magnitude Diff is 6, which is less than the 2*DiffTh, so, the corresponding adjustment group is set to group1. In other words, the weighting coefficient generator 230 may select one of the three adjustment groups to adjust the filter size according to the comparison result of the gradient magnitude Diff and one or more threshold values. It should be noted that the multiple relationship of the aforementioned threshold values DiffTh1, DiffTh2, DiffTh3 and DiffTh4 with the DiffTh are only one embodiment, other multiple relationships may also be used in other embodiments.

Next, the weighting coefficient generator 230 determines the adjustment magnitude $adjust_{similarity}$ based on the adjustment group. The adjustment magnitudes corresponding to the first group, the second group and the third group may be respectively set to a first strength Strength1, a second strength Strength2 and a third strength Strength3, and Strength3>Strength2>Strength1. For example, Strength3 can be set to 2*strength, Strength2 can be set to 1*strength, Strength1=0, where strength can be a value of 0.15. It should be noted that the aforementioned values set to the Strength1, Strength2 and Strength3 are only one embodiment, other values can also be used thereto. Specifically, a greater gradient magnitude Diff indicates that the image is in the high frequency region, and it is necessary to increase the range of adjustment. If gradient magnitude Diff is too large, and it is necessary to reduce the range of adjustment to some extend in order to avoid sharpening or amplifying noise.

The weighting coefficient generator 230 then adjusts the $adjust_{similarity}$ according to the gradient magnitude. Wherein, the interpolation filter may include a first filter for adjusting the weight along the gradient direction and a second filter for adjusting the weight along the edge direction, and the weighting coefficient generator 230 may adjust the size of the interpolation filter for the interpolation operation by compressing the size of the first filter and stretching the size of the second filter.

Assuming that dx and dy respectively represent the parameters along the gradient direction and the edge direction, and the horizontal scaling parameter scalex represents size adjustment magnitude of the first filter along the x-coordinate, the vertical scaling parameter scaley represents size adjustment magnitude of the second filter along the y-coordinate, the scaling parameters scalex along the gradient direction and the scaling parameters scaley along the edge direction can be obtained according to the following formulas:

scale$x$=xBase+adjust$x$; and scale$y$=yBase+adjust$y$, where xBase and yBase can be preset values (for example, both 1), adjustx=2*$adjust_{similarity}$, and adjusty=$adjust_{similarity}$.

Note that the weight Adjust_bicubic can be defined as follows:

Adjust_bicubic($m,n$)=$Rc$(adjust_$dx$)*$Rc$(adjust_$dy$), where the first filter adjust_dx=dx(m, n)/scalex and the second filter adjust_dy=dy (m, n)/scaley.

Figure 8:
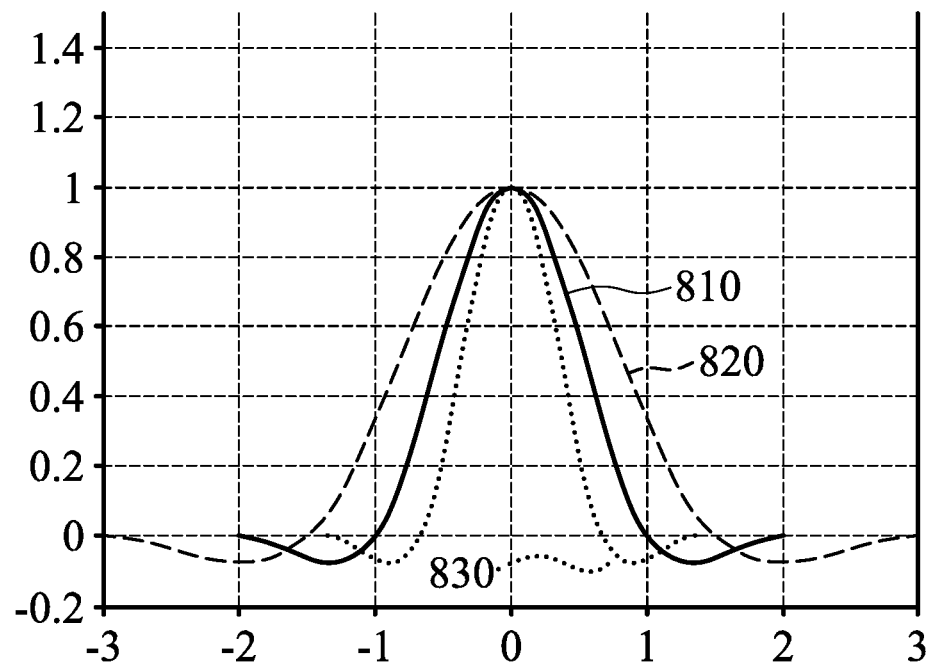
FIG. 8 is a schematic diagram illustrating an exemplary adjustment result of the filter size according to an embodiment.

The weighting coefficient generator 230 can compress the size of the first filter in the direction along the gradient direction (X-axis) and stretch the size of the second filter in the direction along the edge direction (Y-axis) by adjusting scalex and scaley, wherein the range of the adjustment to the filter size may be determined based on the calculation of the noise statistics of the region of interest in the input image. Thus, the result after performing interpolation operation by using the adjusted filter size can retain the high frequency portion of image in the gradient direction and prevent the image edge from blurring by setting small weights of the pixels orthogonal to the edge direction. In addition, the noise and artifacts may be eliminated by setting large weights of the pixels along the edge direction. FIG. 8 is a schematic diagram illustrating an exemplary adjustment result of the filter size according to an embodiment. As shown in FIG. 8, curve 810 represents the interpolation filter size Rc(dx)/Rc(dy) before adjusting the scaling parameter, curve 830 represents the interpolation filter size Rc(dx/scalex) after adjusting the horizontal (x-axis direction) scaling parameter scalex, and curve 820 represents the interpolation filter size Rc(dy/scaley) after adjusting the vertical (y-axis direction) scaling parameter scaley. As can be seen from the curve 830 in FIG. 8, the scalex may be adjusted to be greater than 1, to compress the interpolation filter (e.g., cubic filter) in the direction along the gradient direction. As can be seen from the curve 820 in FIG. 8, the scaley may be adjusted to be less than 1, to stretch the interpolation filter in the direction along with the edge direction.

Please referring again to FIG. 3, after the weight of each source pixel has been calculated, in step S308, the interpolation calculation unit 240 performs the interpolation operation based on the plurality of source pixels and the weight of each of the plurality of source pixels to obtain the pixel value of the destination pixel. In this step, assuming that $Pixel_{out}$ (x_dst, y_dst) represents the pixel value of the pixel whose coordinates (x_dst, y_dst) in the destination image, and $Pixel_{in}$ (x_src, y_src) represents the pixel value of the pixel whose coordinates (x_src, y_src) in the source image, wherein $Pixel_{in}$ (x_src, y_src) locates in the upper left corner of the source image closest to the $Pixel_{out}$ (x_dst, y_dst) after the coordinate transformation, and the horizontal distance between the source pixel and destination pixel is p and the vertical distance between the source pixel and destination pixel is q. Then, if bi-cubic formula is applied to calculate the weights, a weighting calculation can be performed based on the plurality of source pixels and the weight of each of the plurality of source pixels to perform the interpolation operation to obtain the pixel value of the destination pixel by the following formula:

$$Pixel_{out}(\text{x\_dst}, \text{y\_dst}) = \frac{\sum_{m=-1}^{2}\sum_{n=-1}^{2} \text{Adjust\_bicubic}(m, n) * Pixel_m(\text{x\_src}+m-1, \text{y\_src}+n-1)}{\sum_{m=-1}^{2}\sum_{n=-1}^{2} \text{Adjust\_bicubic}(m, n)}$$

where, $$\begin{cases} \text{Adjust\_bicubic}_{rotated}(m, n) = Rc\left(\frac{dx(m, n)}{scalex}\right) * Rc\left(\frac{dy(m, n)}{scaley}\right) \\ scalex = xBase + adjustx \\ scaley = yBase + adjusty \end{cases}$$

$$\begin{cases} adjustx = 2 * adjust_{similarity} \\ adjusty = adjust_{similarity} \end{cases},$$

where cubic( ) is a bi-cubic interpolation function. It should be noted that a bi-cubic interpolation function may be used for performing interpolation operation to obtain the pixel value of the destination pixel in the above-described embodiment. In other embodiments, other interpolation functions, such as bi-linear functions, may also be used for performing interpolation operation.

It should be noted that, although the bi-cubic interpolation method is used for the interpolation calculation in the embodiment described above, but the invention is not limited thereto. For example, in other embodiments, other linear interpolation methods, such as bi-linear interpolation, can also be used for the interpolation calculation.

Therefore, according to the image interpolation method and the related image interpolation apparatus of the present invention, the linear interpolation function can be adjusted according to the gradient direction when performing interpolation operation and the size of the interpolation filter can be adjusted by using the new coordinate formed by the gradient direction of the image and the edge direction orthogonal to the gradient direction so that the interpolation pixels in the direction along the gradient direction have larger weight value and the interpolation pixels in the direction orthogonal to the gradient direction (that is, the edge direction) have smaller weight value, so as to prevent the edge of the destination image from blurring and keep the details of the high frequency portion of the image in the direction along the gradient direction, thus effectively eliminating noise and artifacts and making the destination image has a better quality while keeping the calculation cost lower at the same time.

Systems and methods thereof, or certain aspects or portions thereof, may take the form of a program code (i.e., executable instructions) embodied in tangible media, such as floppy disks, CD-ROMS, hard disks, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wire or cable, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in the art can still make various alterations and modifications without departing from the scope and spirits of the invention. Therefore, the scope of the present invention shall be defined and protected by the following claims and their equivalents.

What is claimed is:

1. An image interpolation method for interpolating a destination pixel of a destination image by using a plurality of source pixels of a source image, performed by an image processing system, comprising:
   selecting the plurality of source pixels from the source image corresponding to the destination pixel;
   obtaining a gradient direction and a gradient magnitude of the destination pixel according to the plurality of source pixels, wherein the plurality of source pixels corresponds to the destination pixel;
   determining a corresponding weight of each of the plurality of source pixels according to the gradient direction and the gradient magnitude of the destination pixel respectively; and
   performing an interpolation operation according to pixel values of the plurality of source pixels and the corresponding weight of each of the plurality of source pixels to obtain a pixel value of the destination pixel.

2. The image interpolation method of claim 1, wherein the step of obtaining the gradient direction according to the plurality of source pixels further comprises:
   calculating a plurality of gradient values of the source pixels according to a plurality of gradient operators, wherein the gradient value includes a horizontal gradient value, a vertical gradient value, a left oblique gradient value, and a right gradient; and
   determining the gradient direction based on a proportional relationship of the gradient values.

3. The image interpolation method of claim 2, wherein the step of obtaining the gradient direction according to the plurality of source pixels further comprises:
   dividing a plurality of edge regions according to angle;
   classifying the two edge regions orthogonal to each other in the edge regions into a same class; and
   selecting one of the classes as the gradient direction according to the proportional relationship of the gradient values.

4. The image interpolation method of claim 1, wherein the step of determining the corresponding weight of each of the plurality of source pixels according to the gradient direction and the gradient magnitude of the destination pixel respectively further comprises:
   obtaining an edge direction according to the gradient direction, wherein the edge direction is orthogonal to the gradient direction;
   converting each of the plurality of source pixels from a first coordinate system to a second coordinate system corresponding to the edge direction, wherein the horizontal axis of the second coordinate system is along the gradient direction and the vertical axis of the second coordinate system is along the edge direction, the source pixel having a first component and a second component corresponding to the second coordinate system, wherein the first component represents a distance between the source pixel and the horizontal axis and the second component represents a distance between the source pixel and the vertical axis; and determining the corresponding weight of the source pixel based on the first component and the second component.

5. The image interpolation method of claim 4, wherein using one of the upper left corner of the plurality of the source pixels closest to the destination pixel on the source image after coordinate transformation as a reference pixel, and forming a sampling window with m columns and n rows, where m=0~m−1, n=0~n−1, wherein the first component and the second component are calculated by the following formulas:

$$\begin{cases} dx(m, n) = \frac{(p + m - 1)\cos(\theta_i) - (q + n - 1)\sin(\theta_i)}{\sin(\theta_i) + \cos(\theta_i)} \\ dy(m, n) = \frac{(p + m - 1)\sin(\theta_i) + (q + n - 1)\cos(\theta_i)}{\sin(\theta_i) + \cos(\theta_i)} \end{cases},$$

where m and n respectively represent the corresponding column position and row position of the source pixel in the sampling window, p and q respectively represent a horizontal distance and a vertical distance of the destination pixel and the reference pixel in the first coordinate system, dx(m, n) represents a horizontal distance between the source pixel on the mth column and the nth row of the sampling window and the destination pixel in the second coordinate system, dy(m, n) represents a vertical distance between the source pixel on the mth column and the nth row and the destination pixel in the second coordinate system, and i represents an edge region number, represents the angle value of the edge region.

6. The image interpolation method of claim 4, wherein the step of determining the corresponding weight of the source pixel based on the first component and the second component further comprises:
adjusting a size of at least one interpolation filter for performing the interpolation operation based on the first component and the second component; and
determining the corresponding weight of the source pixel based on the size of the at least one interpolation filter after adjusted.

7. The image interpolation method of claim 6, further comprising:
setting a plurality of adjustment groups with different adjustment magnitude;
selecting one of the plurality of adjustment groups according to a gradient magnitude; and
adjusting the size of the at least one interpolation filter for performing the interpolation operation according to the adjustment magnitude corresponding to the adjustment group after performing selecting.

8. The image interpolation method of claim 6, wherein the at least one interpolation filter includes a first filter for adjusting a weight along the gradient direction and a second filter for adjusting a weight along the edge direction and a size of the first filter is determined based on a scaling parameter along the gradient direction, and a size of the second filter is determined based on a scaling parameter along the edge direction.

9. The image interpolation method of claim 8, wherein the scaling parameter along the gradient direction and the scaling parameter along the edge direction are determined based on the adjustment magnitude.

10. The image interpolation method of claim 1, wherein the corresponding weight of each of the plurality of source pixels is determined by a bi-cubic interpolation function or a bi-linear function.

11. An image interpolation device for interpolating a destination pixel of a destination image using a plurality of source pixels of a source image, comprising:
an interpolation coordinate calculation circuit for performing a coordinate transformation to select the plurality of source pixels from the source image corresponding to the destination pixel;
an interpolation direction determination circuit coupled to the interpolation coordinate calculation circuit for obtaining a gradient direction and a gradient magnitude of the destination pixel according to the plurality of selected source pixels, wherein the plurality of source pixels corresponds to the destination pixel;
a weighting coefficient generation circuit coupled to the interpolation direction determination circuit for determining a corresponding weight of each of the plurality of source pixels according to the gradient direction and the gradient magnitude of the destination pixel respectively; and
an interpolation calculation circuit coupled to the interpolation coordinate calculation circuit and the weighting coefficient generation circuit for performing an interpolation operation based on pixel values of the plurality of source pixels and the corresponding weight of each of the plurality of source pixels to obtain a pixel value of the destination pixel.

12. The image interpolation device of claim 11, wherein the interpolation direction determination circuit is further configured to calculate a plurality of gradient values of the plurality of source pixels according to a plurality of gradient operators, wherein the gradient value includes a horizontal gradient value, a vertical gradient value, a left oblique gradient value, and a right gradient, and determines the gradient direction based on a proportional relationship of the gradient values.

13. The image interpolation device of claim 12, wherein the interpolation direction determination circuit is further configured to divide a plurality of edge regions according to angle, classify the two edge regions orthogonal to each other in the edge regions into a same class, and select one of the classes as the gradient direction according to the proportional relationship of the gradient values.

14. The image interpolation device of claim 11, wherein the weighting coefficient generation circuit is further configured to obtain an edge direction according to the gradient direction, wherein the edge direction is orthogonal to the gradient direction, convert each of the plurality of source pixels from a first coordinate system to a second coordinate system corresponding to the edge direction, wherein the horizontal axis of the second coordinate system is along the gradient direction and the vertical axis of the second coordinate system is along the edge direction, the source pixel having a first component and a second component corresponding to the second coordinate system, wherein the first component represents a distance between the source pixel and the horizontal axis and the second component represents a distance between the source pixel and the vertical axis, and determine the corresponding weight of the source pixel based on the first component and the second component.

15. The image interpolation device of claim 14, wherein the weighting coefficient generation circuit use one of the upper left corner of the plurality of the source pixels closest to the destination pixel on the source image after coordinate transformation as a reference pixel, and forms a sampling window with m columns and n rows, where m=0~m−1, n=0~n−1, wherein the first component and the second component are calculated by the following formulas:

$$\begin{cases} dx(m, n) = \dfrac{(p+m-1)\cos(\theta_i) - (q+n-1)\sin(\theta_i)}{\sin(\theta_i) + \cos(\theta_i)} \\ dy(m, n) = \dfrac{(p+m-1)\sin(\theta_i) + (q+n-1)\cos(\theta_i)}{\sin(\theta_i) + \cos(\theta_i)} \end{cases},$$

where m and n respectively represent the corresponding column position and row position of the source pixel in the sampling window, p and q respectively represent a horizontal distance and a vertical distance of the destination pixel and the reference pixel in the first coordinate system, dx(m, n) represents a horizontal distance between the source pixel on the mth column and the nth row of the sampling window and the destination pixel in the second coordinate system, dy(m, n) represents a vertical distance between the source pixel on the mth column and the nth row and the destination pixel in the second coordinate system, and i represents an edge region number, represents the angle value of the edge region.

16. The image interpolation device of claim 15, wherein the weighting coefficient generation circuit is further configured to adjust a size of at least one interpolation filter for performing the interpolation operation based on the first component and the second component and determine the corresponding weight of the source pixel based on the size of the at least one interpolation filter after adjusted.

17. The image interpolation device of claim 16, wherein the weighting coefficient generation circuit is further configured to set a plurality of adjustment groups with different adjustment magnitude, select one of the plurality of adjustment groups according to a gradient magnitude, and adjust the size of the at least one interpolation filter for performing the interpolation operation according to the adjustment magnitude corresponding to the adjustment group after performing selecting.

18. The image interpolation device of claim 16, wherein the at least one interpolation filter includes a first filter for adjusting a weight along the gradient direction and a second filter for adjusting a weight along the edge direction and a size of the first filter is determined based on a scaling parameter along the gradient direction, and a size of the second filter is determined based on a scaling parameter along the edge direction.

19. The image interpolation device of claim 18, wherein the scaling parameter along the gradient direction and the scaling parameter along the edge direction are determined based on the adjustment magnitude.

20. The image interpolation device of claim 11, wherein the corresponding weight of each of the plurality of source pixels is determined by a bi-cubic interpolation function or a bi-linear function.

* * * * *